US008788890B2

(12) United States Patent
Kim et al.

(10) Patent No.: US 8,788,890 B2
(45) Date of Patent: Jul. 22, 2014

(54) DEVICES AND METHODS FOR BIT ERROR RATE MONITORING OF INTRA-PANEL DATA LINK

(75) Inventors: Taesung Kim, Los Altos, CA (US); Paolo Sacchetto, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 13/204,214

(22) Filed: Aug. 5, 2011

(65) Prior Publication Data

US 2013/0036335 A1 Feb. 7, 2013

(51) Int. Cl.
*G06F 11/00* (2006.01)

(52) U.S. Cl.
USPC .......... 714/704

(58) Field of Classification Search
CPC .......... G09G 5/006; G09G 2370/047; G09G 2370/042; G09G 2370/10; G09G 2370/04; G09G 5/005; G06F 3/14; G06F 3/147
USPC .......... 714/704, 776, 739, 738, 39, 799, 736, 714/51, 732, 37, 57, 47.1, 47.2, 56, 43, 705, 714/712; 370/522, 236, 438, 241, 248; 345/204, 520
See application file for complete search history.

(56) References Cited

U.S. PATENT DOCUMENTS

| | | | | | |
|---|---|---|---|---|---|
| 5,726,991 | A * | 3/1998 | Chen et al. | | 714/704 |
| 5,963,193 | A | 10/1999 | Knox et al. | | |
| 6,745,353 | B2 * | 6/2004 | Susnow et al. | | 714/706 |
| 7,620,062 | B2 * | 11/2009 | Kobayashi | | 370/433 |
| 7,788,571 | B2 * | 8/2010 | Waschura et al. | | 714/795 |
| 7,801,206 | B2 * | 9/2010 | Calvin et al. | | 375/228 |
| 2002/0133762 | A1 * | 9/2002 | Susnow et al. | | 714/704 |
| 2003/0084384 | A1 * | 5/2003 | White et al. | | 714/704 |
| 2003/0095123 | A1 | 5/2003 | Hahn | | |
| 2004/0221315 | A1 * | 11/2004 | Kobayashi | | 725/126 |
| 2006/0143549 | A1 * | 6/2006 | Yasumoto et al. | | 714/704 |
| 2007/0033448 | A1 * | 2/2007 | Waschura et al. | | 714/704 |
| 2010/0031098 | A1 * | 2/2010 | Kobayashi | | 714/715 |

* cited by examiner

*Primary Examiner* — Phung M Chung
(74) *Attorney, Agent, or Firm* — Fletcher Yoder PC

(57) ABSTRACT

Devices and methods for monitoring a bit error rate of an intra-panel data link (e.g., a chip-on-glass (COG) data link) between a timing controller and a display driver circuitry, according to an embodiment. The timing controller may send test data over a data link to the display driver circuitry. The test data may include a known or predictable stream of data. The display driver circuitry may receive the test data via the data link and detect bit errors based at least partly on the test data. An indication of the bit errors may be displayed on an array of pixels of the display or provided to the timing controller via a separate back channel data link.

26 Claims, 15 Drawing Sheets

DEVICES AND METHODS FOR BIT ERROR RATE MONITORING OF INTRA-PANEL DATA LINK

BACKGROUND

The present disclosure relates generally to an electronic display for an electronic device and, more particularly, to an electronic display with bit error rate (BER) detection circuitry.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs) and organic light emitting diode (OLED) displays, are commonly used in electronic devices such as televisions, computers, and phones. The electronic displays display images when image data is sent by a timing controller (TCON) to display drivers in the electronic display. Conventionally, this image data from the TCON is sent at a sufficiently low frequency such that bit errors are relatively uncommon.

Chip-on-glass (COG) data links may connect the TCON to each display driver. Many failure modes could occur in the COG data links that could make one the bit error rate (BER) of image data received by some display drivers worse than others. Some failures may be obvious during manufacturing and may be relatively easy to spot. These obvious failures may manifest as screen noise visible to a human operator, allowing manufacturers to discard or repair the electronic display. Latent failures, however, may not at first be serious enough to cause any visible display noise at the time of manufacturing. These latent failures could go unscreened, later manifesting as long-term failures after sale to a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for monitoring a bit error rate of an intra-panel data link (e.g., a chip-on-glass (COG) data link) between a timing controller and a display driver. For example, an electronic display according to an embodiment may include a timing controller and display driver circuitry. The timing controller may send test data over a data link to the display driver circuitry. The test data may include a known or predictable stream of data. The display driver circuitry may receive the test data via the data link and detect bit errors based at least partly on the test data.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
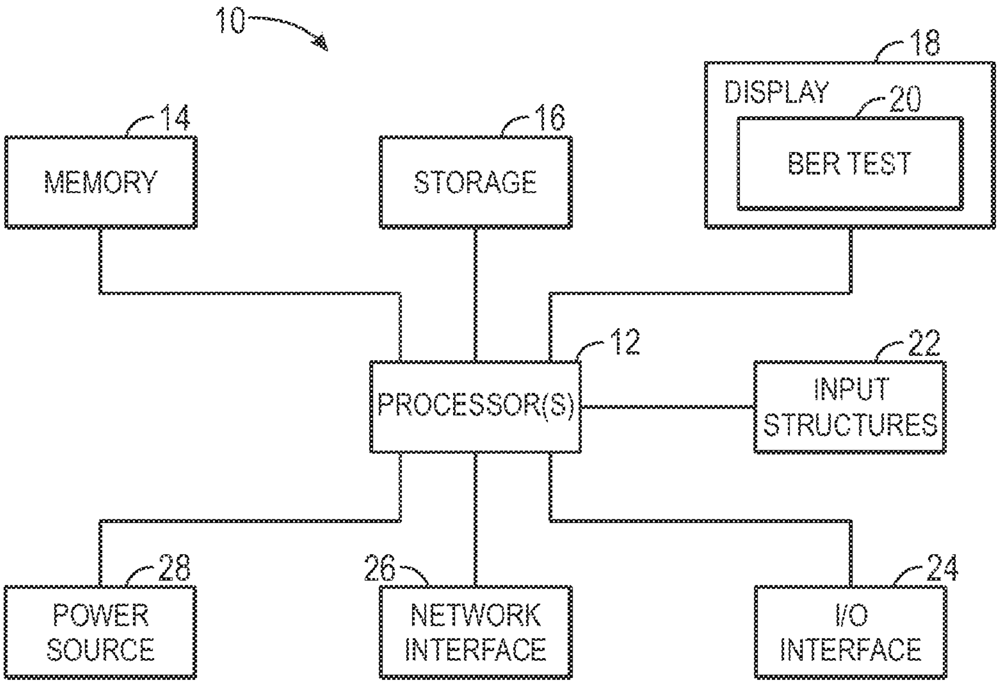
FIG. 1 is a block diagram representing an electronic device having a display with bit error rate (BER) detection circuitry, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned briefly above, bit errors in electronic displays may be relatively rare when image data signals are provided at sufficiently low frequencies across chip-on-glass (COG) data links in the electronic display. However, to support higher display resolutions, the frequency of the image data signals may increase significantly, and bit errors on the COG data links may become more serious. If the bit error rate (BER) of a COG data link is serious enough, all or part of the electronic display may show screen noise.

Since not all failure modes of the chip-on-glass (COG) data links may be apparent at the time of manufacturing, embodiments of the present disclosure relate to electronic displays that can detect the bit error rate (BER) of image data on the COG data links. Thus, even if the imminent failure of a COG data link is not visible to the naked eye, a manufacturer of electronic displays, or electronic devices incorporating the electronic displays, can determine in advance whether the electronic display is likely to fail at some point in the future. The manufacturer then may take remedial action to prevent a failure of the electronic display from occurring in the hands of the ultimate customer. Using an electronic display according to present embodiments, for example, the manufacturer may identify that an electronic display has a COG data link with a BER that exceeds a threshold. The manufacturer then may repair or discard the electronic display long before any obvious failures are visible.

Embodiments of the present disclosure involve identifying the bit error rate (BER) of the chip-on-glass (COG) data links despite unidirectional nature of these data links. Specifically, to reduce the number of data channels in the electronic display, all but one of the COG data links between the timing controller (TCON) and the display drivers (e.g., column drivers) are typically unidirectional from the TCON to the display driver. Thus, each data driver may receive data from respective COG data links from the TCON. However, all data drivers may share a separate back channel data link that can provide a signal unidirectionally from the display drivers to the TCON. Generally, this COG data link operates as an emergency lost clock data link to allow any of the display drivers to request resynchronization with the TCON.

The display drivers may include bit error rate (BER) test circuitry that can determine the BER of the unidirectional chip-on-glass (COG) data links from the timing controller (TCON) to the display drivers. Because the COG data links are unidirectional, the display drivers cannot simply provide an indication of the BER to the TCON over the same data links that are being tested. As such, as will be discussed in greater detail below, the display drivers may cause an indication of the BER to be displayed on a segment of the electronic display or may send an indication of the BER, one at a time, over the emergency lost clock data link back to the TCON. As described herein, the term "indication of the BER" refers to any indication of the rate of bit errors or any indication of a count of bit errors that can be used to infer BER (e.g., by comparing the count of the bit errors to elapsed time).

Figure 2:
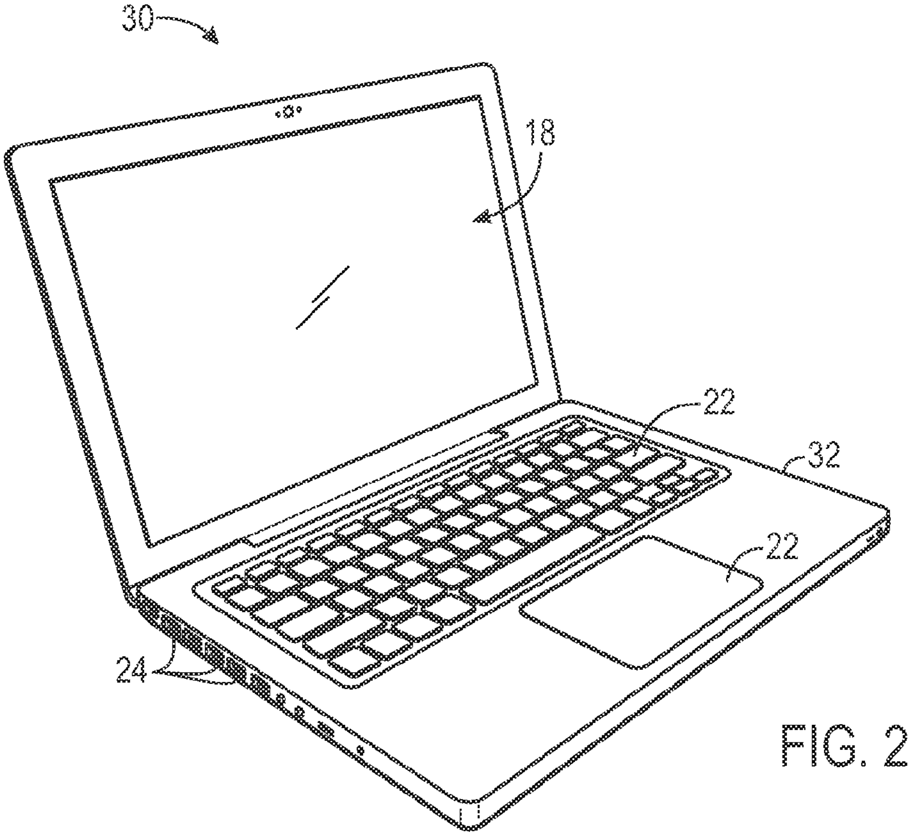
FIG. 2 is a perspective view of a notebook computer representing an embodiment of the electronic device of FIG. 1.
Figure 3:
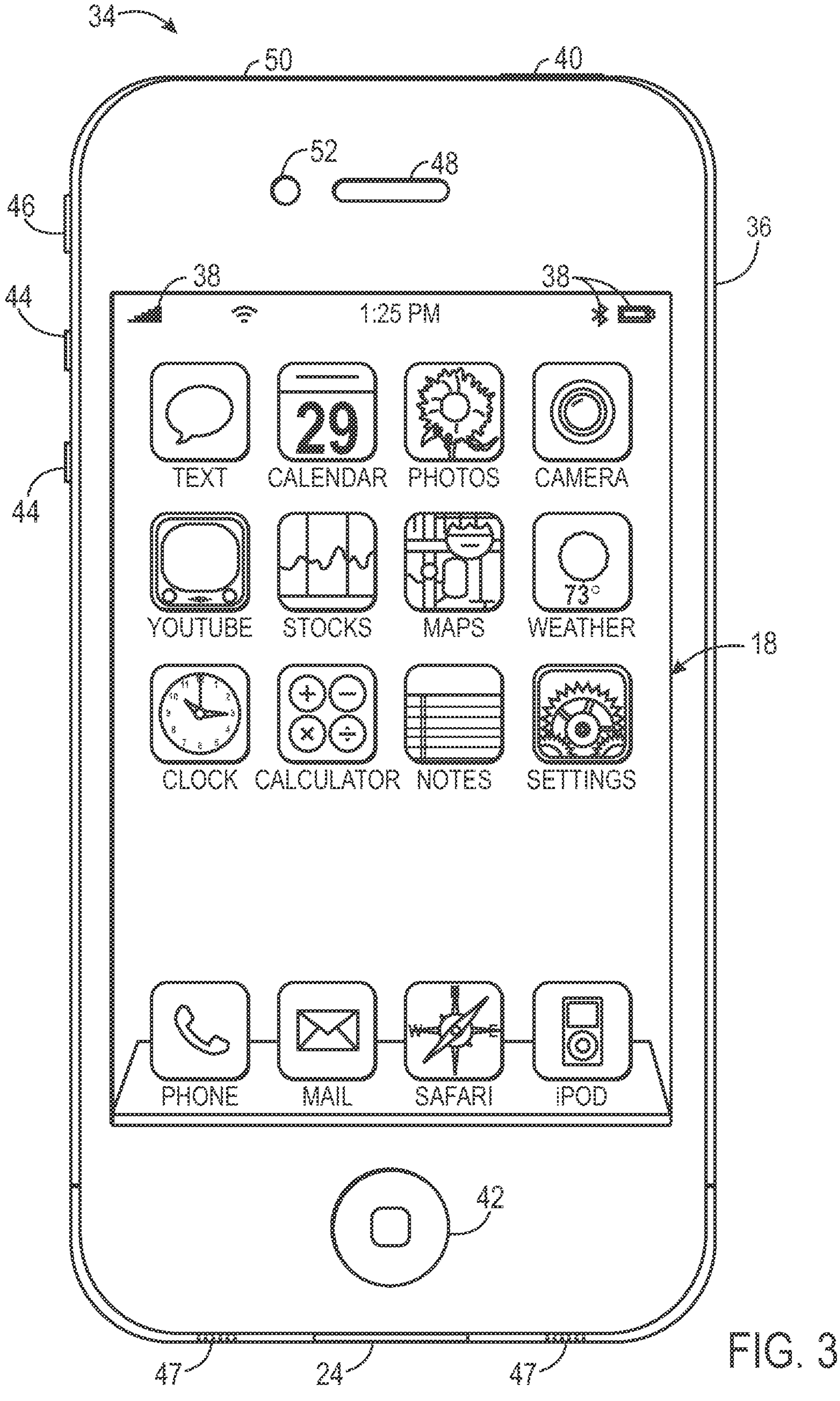
FIG. 3 is a front view of a handheld device, representing one embodiment of the electronic device of FIG. 1.

With the foregoing in mind, a general description of suitable electronic devices that may employ electronic displays having intra-display bit error rate (BER) detection capabilities will be provided below. In particular, FIG. 1 is a block diagram depicting various components that may be present in an electronic device suitable for use with such a display. FIGS. 2 and 3 respectively illustrate perspective and front views of suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18 having bit error rate (BER) test circuitry 20, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to execute instructions to carry out, among other things, the techniques disclosed herein. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable other functions of the electronic device 10.

The display 18 may be a touch-screen liquid crystal display (LCD) or organic light emitting diode (OLED) display, for example, which may enable users to interact with a user interface of the electronic device 10. In some embodiments, the display 18 may be a MultiTouch™ display that can detect multiple touches at once. The display 18 may support relatively high display resolutions (e.g., WQXGA or QXGA) in some cases and, as a result, may transmit image data internally using relatively high-frequency data signals (e.g., 270 MHz, or 540 Mbps). At these higher frequencies, bit errors on internal data links of the display 18 could become more serious. If the bit error rate (BER) is serious enough, all or part of the display 18 screen may show screen noise. Since not all failure modes of the chip-on-glass (COG) data links may be apparent at the time of manufacturing, the display 18 may include BER test circuitry 20 that can detect the bit error rate (BER) of the internal data links. Thus, even if the imminent failure of a COG data link is not visible to the naked eye, a manufacturer of the display 18 or of the electronic device 10 can determine in advance whether the display 18 is likely to fail at some point in the future. As discussed further below, the manufacturer then may take remedial action to prevent a failure of the display 18 from occurring in the hands of the end user. The BER test circuitry 20 may display an indication of the BERs on the display 18 or send an indication of the BERs to the processor(s) 12.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on display 18. The display 18 may include the bit error rate (BER) test circuitry 20 to detect and indicate the bit error rate (BER) of its internal data links for quality control and statistics-gathering.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate user interface 20 to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. The display 18 may include the bit error rate (BER) test circuitry 20 to detect and indicate the BER of its internal data links for quality control and statistics-gathering.

Figure 4:
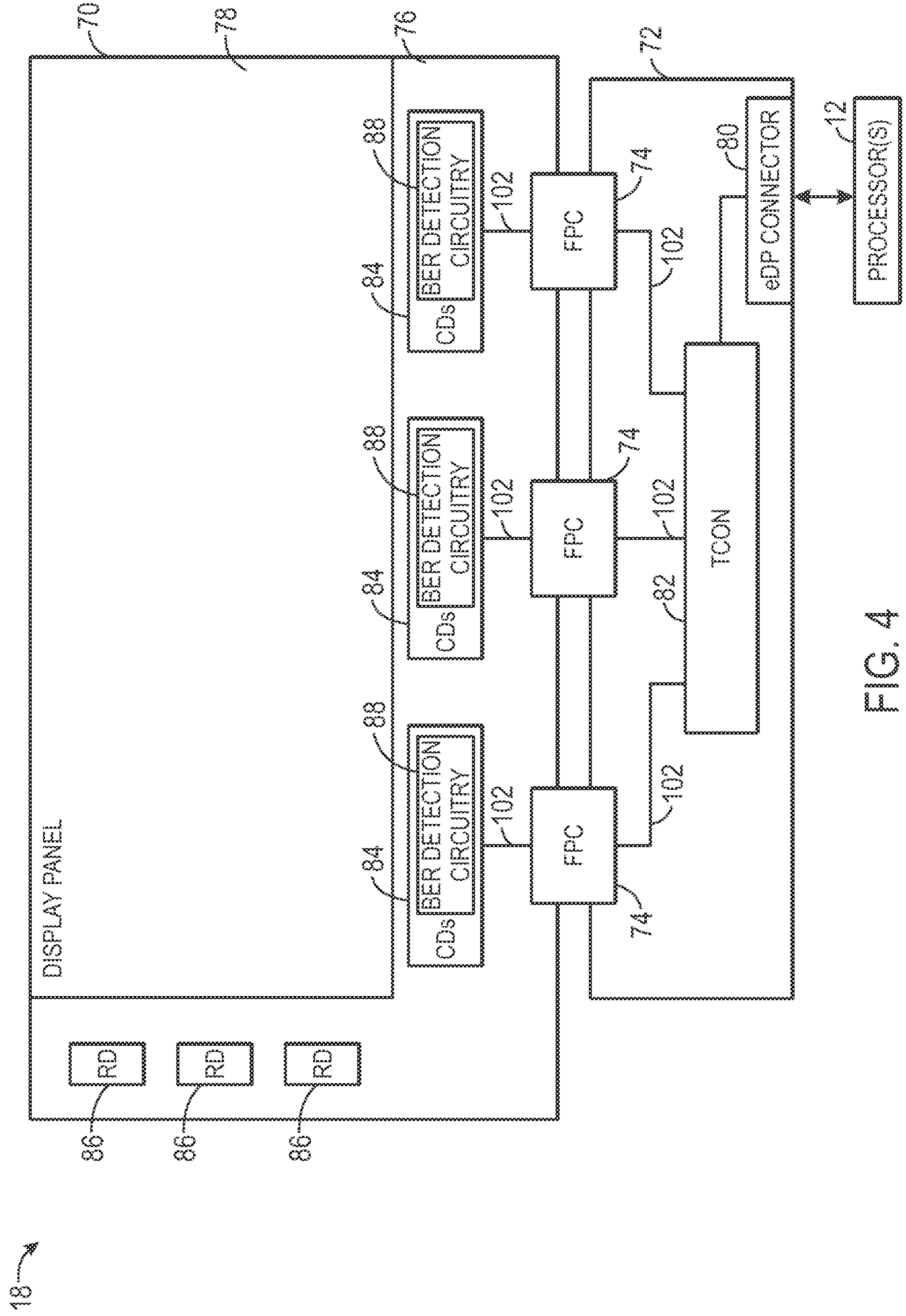
FIG. 4 a block diagram of the electronic display of the electronic device of FIG. 1, in accordance with an embodiment.

As noted above, the display 18 may generally receive and display a relatively high amount of image data and may include the bit error rate (BER) test circuitry 20 to detect and indicate the BER of its internal data links. As will be discussed with reference to FIG. 4, the various internal components of the display 18 may allow the display 18 to enter a BER test mode. As shown in FIG. 4, a display panel 70 of the display 18 may be communicably coupled to an electronic display interface 72 via any suitable number of flexible printed circuit (FPC) interconnections 74. The display panel 70 of the display 18 may include an active display area 78 having an array of pixels and display driver circuitry 76 that program the array of pixels.

To display images on active display area 78, one or more of the processor(s) 12 may provide image data to the electronic display interface 72 via any suitable connector. In FIG. 4, this connector is shown to be an Embedded Display Port (eDP) connector 80. Additionally or alternatively, the connector may be an Internal Display Port (iDP) connector, a High-Definition Media Interface (HDMI) or Digital Visual Interface (DVI) connector, or Mobile Industry Processor Interface (MIPI) connector, for example. As will be discussed in greater detail below, in addition to providing image data signals, the processor(s) 12 also may control certain operational parameters of the display 18. Among other things, the processor(s) 12 may cause the display 18 to enter a bit error rate (BER) test mode. While in the BER test mode, latent failures of any data links from the electronic display interface 72 to the display driver circuitry 76 of the display 18 may be detected.

During ordinary operation of the display 18, a timing controller (TCON) 82 may receive image data signals from the processor(s) 12 via the eDP connector 80. The TCON 82 then may transmit the image data signals through the FPC interconnections 74 to the display driver circuitry 76. In particular, the image data signals may be provided to certain display drivers of the display driver circuitry 76, such as column drivers (CDs) 84, over respective unidirectional data links 102. The column drivers (CDs) 84 may represent data drivers, of which the display 18 may include any suitable number. Though only three are illustrated in the schematic block diagram of FIG. 4, the display 18 may include more or fewer. Each of the column drivers (CDs) 84 may program the image data signals onto a segment of the active display area 78.

Specifically, the column drivers (CDs) 84 may operate in concert with row drivers (RDs) 86. A row driver 86 may activate one row of pixels of the active display area 78 and the column drivers (CDs) 84 may respectively program one segment of the activated row of pixels with the image data. As the row drivers (RDs) 86 activate successive rows of pixels, the column drivers (CDs) 84 may successively program the activated pixels with the image data. As a result, images may be displayed on the active display area 78.

Ideally, bit errors will be infrequent in the image data sent over the data links 102. To reduce potential bit errors, the TCON 82 and/or the column drivers (CDs) 84 may be programmed to improve the tuning of the data links 102. Indeed, the TCON 82 and/or the column drivers (CDs) 84 may include a variety of programming options to characterize and/or smooth the performance of the data links 102. It may be difficult, however, to tune the data links 102 based on visual observation alone, since a human operator may not be able to detect the performance of the data links 102 with sufficient responsiveness. In other words, it may be very difficult to know the actual difference in the bit error rate (BER) of a data link 102 before and after applying minor tuning changes, as the human eye may not be able to detect such small changes. Moreover, it is possible that a data link 102 between the TCON 82 to the display driver circuitry 76 could fail. A failure of a data link 102 could cause the bit error rate (BER) to be so high as to result in display errors. For example, such a failure could produce screen noise that is visible to a user of the display 18. When a latent failure is not immediately apparent at the time of the manufacture of the display 18 or the electronic device 10, the failure could manifest itself at a later time after being sold to a user.

To allow manufacturers or repair technicians to more effectively tune the data links 102, as well as to detect a latent failure of a data link 102 between the timing controller (TCON) 82 and the display driver circuitry 76 (e.g., a column drivers (CD) 84), the column drivers (CDs) 84 may include bit error rate (BER) detection circuitry 88. As will be described in greater detail below, the BER detection circuitry 88 may operate in conjunction with certain circuitry of the TCON 82 to detect the BER of the data links 102 between the TCON 82 and the column drivers (CDs) 84. These elements may be understood to represent the BER test circuitry 20 discussed above with reference to FIG. 1. Even though the BER of a data link 102 may be too low to produce obvious screen noise on the active display area 78 at the time of manufacture, the BER detection circuitry 88 may be able to determine the BER. Thus, the BER detection circuitry 88 may help identify possible future points of failure.

Since, as noted above, the data links 102 may be unidirectional from the timing controller (TCON) 82 to the column drivers (CDs) 84, the bit error rate (BER) detection circuitry 88 cannot transmit an indication of the BER back to the TCON 82 over the data link 102. Rather, as will be discussed in greater detail below with reference to FIGS. 5-11, the column drivers (CDs) 84 may program an indication of the BER on a segment of the active display area 78 of the display 18. Additionally or alternatively, as discussed below with reference to FIGS. 12-18, the BER detection circuitry 88 may provide an indication of the BER using an emergency lost clock data link, which may be common to all of the column drivers (CDs) 84.

Figure 5:
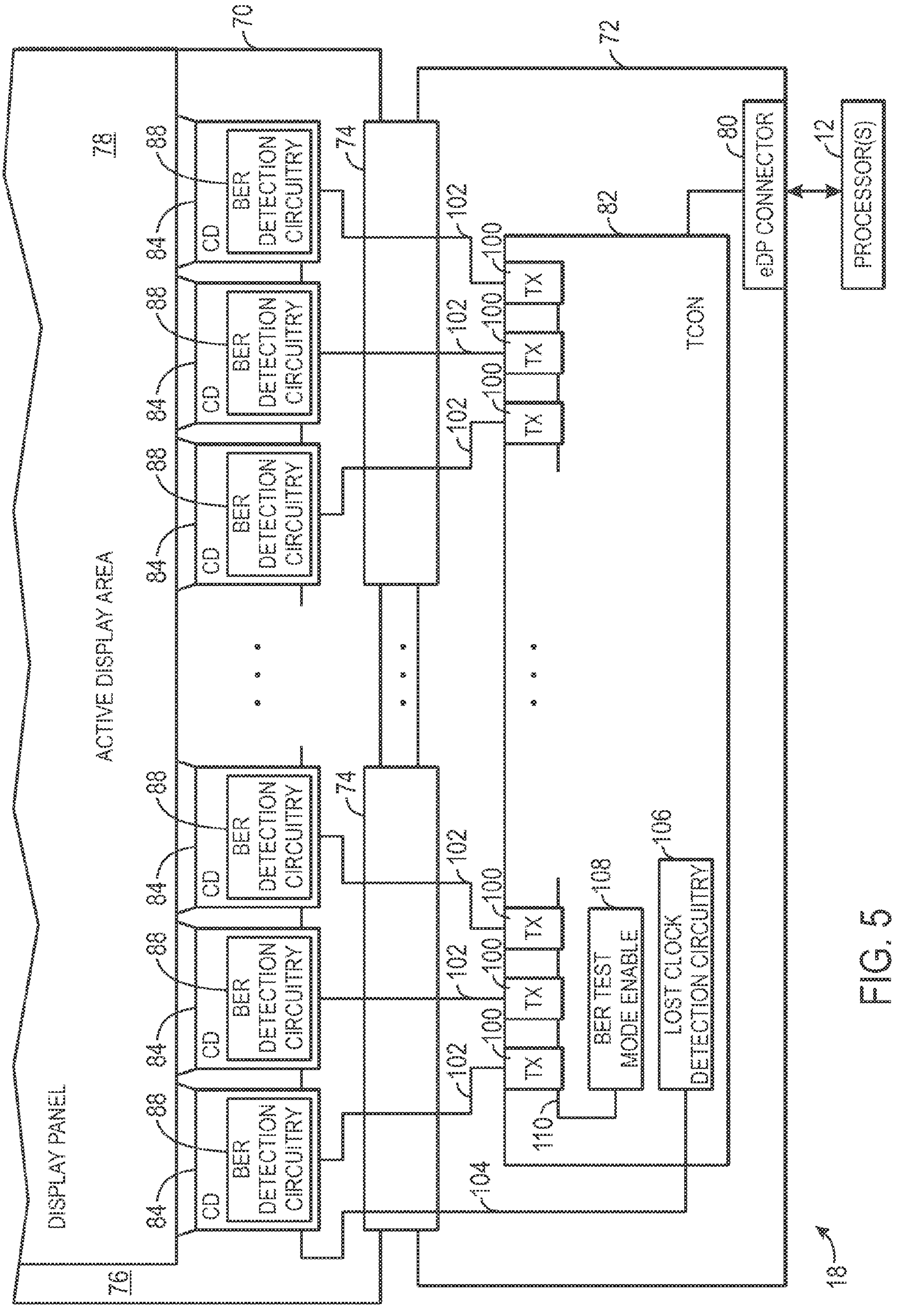
FIG. 5 is a block diagram of the electronic display of FIG. 4 that offers a closer view of bit error rate (BER) detection circuitry that displays an indication of the BER on the electronic display, in accordance with an embodiment.

FIG. 5 represents an example of the display 18 that can detect a bit error rate (BER) of the interconnection 102 and provide an indication of the BER on the active display area 78. As seen in FIG. 5, the timing controller (TCON) 82 includes several transmitters (TXs) 100 that communicate with respective column drivers (CDs) 84 via a unidirectional data link 102. Only six TXs 100 and column drivers (CDs) 84 are illustrated in FIG. 5, but it should be understood that any suitable number may be employed. For example, the display 18 may employ nine or more TXs 100 and column drivers (CDs) 84. As mentioned above, the TCON 82 may transmit image data signals to the column drivers (CDs) 84 via these respective unidirectional data links 102. Each TX 100 may transmit data in an embedded-clock format. As such, an emergency lost-clock data link 104 may be shared by all of the column drivers (CDs) 84. If one of the column drivers (CDs) 84 loses synchronization with the embedded clock of the data signal from the timing controller (TCON) 82, that column driver (CD) 84 may transmit a lost clock signal across the emergency lost-clock data link 104 to the TCON 82. Lost-clock detection circuitry 106 of the TCON 82 may receive and decode the lost clock signal on the emergency lost-clock data link. The TCON 82 then may retrain all data links 102 so the column drivers (CDs) 84 can be synchronized with the embedded clock of the data signal.

As mentioned above, the timing controller (TCON) 82 provides image data signals, which the TCON 82 received from the processor(s) 12 via the eDP connector 80, to the column drivers (CDs) 84. The column drivers (CDs) 84 then may cause the pixels of the active display area 78 to be programmed using these image data signals. If there is an obvious failure of a unidirectional data link 102, the failure may cause the image data signal transmitted across it to become distorted. Thus, the pixels may be programmed incorrectly. In particular, the segment of the active display area 78 programmed by the column driver (CD) 84 associated with that data link 102 may become distorted. For example, the portion of the active display area 78 programmed by the column driver (CD) 84 may have excessive screen noise.

Detecting the bit error rate (BER) of the various data links 102 may provide an indication of which data links 102 are likely to fail some time in the future, even if no screen noise is apparent. To begin detecting and providing an indication of the bit error rate (BER) of each data link 102, the display 18 may enter a BER test mode. In particular, BER test mode enable circuitry 108 of the timing controller (TCON) 82 may cause the transmitters (TXs) 100 to begin transmitting test data, rather than image data, to the column drivers (CDs) 84. Upon receipt of this test data, the BER detection circuitry 88 of the column drivers (CDs) 84 may begin determining a BER of each respective data link 102. The BER test mode enable circuitry 108 may be activated, for example, by a control signal from the processor(s) 12.

Figure 6:
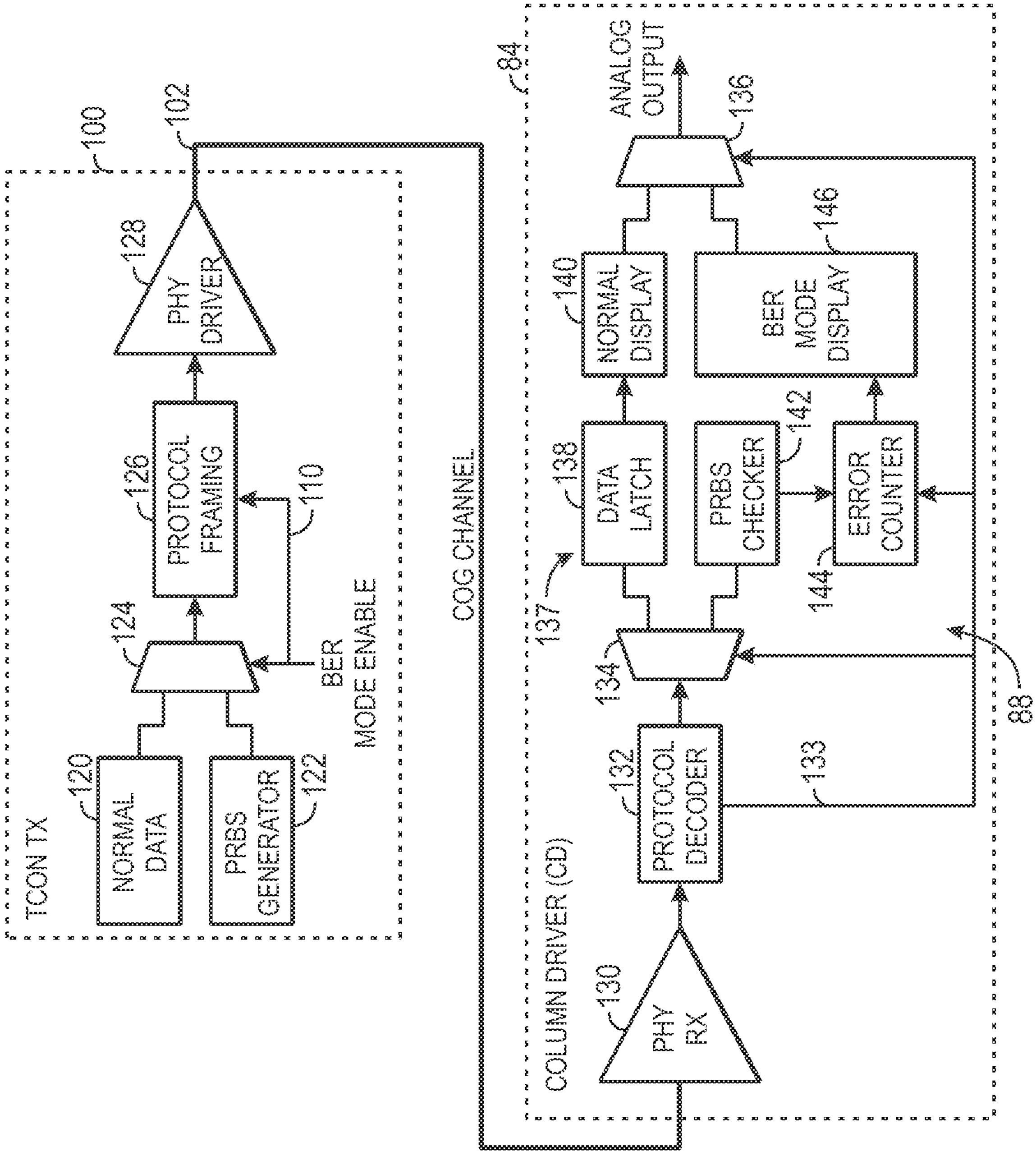
FIG. 6 is a block diagram of communication circuitry of a timing controller (TCON) and one display driver of the electronic display of FIG. 5 that enables a bit error rate (BER) test mode, in accordance with an embodiment.

One example of the circuitry in a transmitter (TX) 100 and a column driver (CD) 84 to carry out a bit error rate (BER) test mode appears in FIG. 6. As can be seen in FIG. 6, the TX 100 ordinarily may selectively transmit normal data 120 or test data (e.g., pseudorandom binary sequence (PRBS) data from, for example, a PRBS generator 122). Although the test data is represented in FIG. 6 as PRBS data, it should be understood that the test data may represent any known or predictable stream of data. As will be discussed below, because the test data may be known or predictable, the column driver (CD) 84 associated with the transmitter (TX) 100 may be able to discern when bit errors occur in transit between the TX 100 and the column driver (CD) 84.

The normal data 120 or test data from the PRBS generator 122 may be selected (e.g., via a multiplexer 124) based on the BER test mode enable signal 110. The BER test mode enable signal 110 also may cause a protocol framing block 126 to alternatively indicate that normal data 120 or test data from the PRBS generator 122 is being provided. Specifically, the protocol framing block 126 may packetize and frame the normal data 120 and the test data from the PRBS generator 122 in different ways. Based on the framing and packetizing of the protocol framing block 126, the column driver (CD) 84 may be able to identify whether the data is the normal data 120 or test data from the PRBS generator 122. In any case, this packetized data may be handed over to a physical transmitter driver (PHY driver) 128. The PHY driver 128 may physically transmit the data from the TX 100 over the data link 102 to the column driver 84.

A physical receiver (PHY RX) 130 in the column driver (CD) 84 may receive the data from the PHY driver 128 of the TX 100. The received data may be processed by a protocol decoder 132, which may depacketize and determine, based on the framing of the received data, whether the received data is normal data 120 or test data. In addition, the protocol decoder 132 may output a corresponding selection signal 133 depending on whether the received data is normal data or test data.

The selection signal 133 may cause multiplexers 134 and 136 to respectively couple to circuitry for normal operation or to components of the bit error rate (BER) detection circuitry 88. For example, when the protocol decoder 132 detects that the received data is the normal data 120, the selection signal 133 may cause the normal data 120 to be received by normal operation circuitry 137. The normal operation circuitry 137 may include, for example, a data latch block 138 and normal display circuitry 140. As mentioned above, the normal data 120 generally includes image data to be displayed on the active display area 78 of the display 18. As such, when the normal display circuitry 140 receives the normal data 120, the normal display circuitry 140 may output pixel programming signals (e.g., in analog format) to program the pixels of a segment of the active display area 78 to display the image data.

When the protocol decoder 132 instead detects that the received data is the test data (e.g., from the PRBS generator 122), signaling that the display 18 has entered the BER test mode, the selection signal 133 may cause the received test data to be received by the bit error rate (BER) detection circuitry 88. This BER detection circuitry 88 may include components to detect bit errors of the test data, count the bit errors, and cause an indication of the BER to be programmed on the active display area 78 of the display 18. The indication of the BER may be, for example, the total number of bit errors detected once test data is received. An operator or other electronic device may thus discern from the total number of bit errors and the amount of time since the display 18 entered a BER test mode what the BER may be. Alternatively, the indication of the BER may be the actual rate of the bit errors that are being detected over some period of time (e.g., the number of bit errors detected over a one-second period).

By way of example, as shown in FIG. 6, the BER detection circuitry 88 may include a PRBS checker 142, an error counter 144, and BER mode display circuitry 146. The PRBS checker 142 may detect bit errors in the test data when the test data is PRBS test data from the PRBS generator 122. When the PRBS checker 142 detects a bit error, the PRBS checker 142 may cause the error counter 144 to be incremented by one. In some embodiments, the error counter may only count the number of bit errors detected since the column driver (CD) 84 began receiving the test data. Thus, the error counter may be reset each time the display 18 is switched into the BER test mode (e.g., when the selection signal 133 switches the data from the normal operation circuitry 137 into the BER detection circuitry 88). Depending on the value held in the error counter 144, the BER mode display circuitry 146 may output different pixel programming signals to program an indication of the BER onto the pixels of the active display area 78. An operator or electronic device (e.g., a camera) then may be able to see the indication of the BER and decide whether the BER is too high.

The bit error rate (BER) mode display circuitry 146 may program an indication of the BER of the data link 102 onto the active display area 78 in a variety of ways. For example, as will be discussed further below with reference to FIGS. 8 and 9, the BER mode display circuitry 146 may cause groups of pixels (e.g., columns of pixels) to be set to one of two colors in numbers proportional to the count of the error counter 144. By way of example, the BER mode display circuitry 146 may cause all columns of pixels that are supplied with data from the column driver (CD) 84 to the black when the error counter 144 indicates that no errors are present. As the PRBS checker 142 detects a bit error and the error counter 144 is correspondingly incremented, the BER mode display circuitry 146 may cause a column of pixels to be set to white. Thus, as the value held by the error counter 144 increases, the number of columns of white pixels on the active display area 78 of the display 18 grows correspondingly. As should be appreciated, any suitable colors may be employed (e.g., errors may be represented by black rather than white, and so forth).

Alternatively, the BER mode display circuitry 146 may program an indication of the BER of the data link 102 onto the active display area 78 in any other suitable manner. For example, the BER mode display circuitry 146 may cause some or all pixels of the segment of the active display area 78 programmed by the column driver (CD) 84 to be of different colors for different values of the error counter 144. For example, when the error counter 144 indicates that no bit errors have been detected by the PRBS checker 142, the BER mode display circuitry 146 may output only pixel programming signals that cause black pixels to be displayed on the segment of the active display area programmed by the column driver (CD) 84. As more bit errors are detected by the PRBS checker 142 and the value held by the error counter 144 increases, the BER mode display circuitry 146 may output pixel programming signals that cause the pixels to become progressively lighter. Thus, varying shades of gray may indicate varying quantities of bit errors detected since entering the BER test mode.

In still other embodiments, the BER mode display circuitry 146 may cause certain characters to be displayed for various values of the error counter 144. For example, the BER mode display circuitry 146 may output pixel programming signals that cause numerals indicating the value held by the error counter 144 to be displayed on the segment of the active display area 78 programmed by the column driver (CD) 84. In another embodiment, the BER mode display circuitry 146 may cause a particular color to be displayed on the segment of the active display area 78 programmed by the column driver (CD) 84. To provide one example, the BER mode display circuitry 146 may cause its segment of the active display area 78 to display a particular color that indicates whether the BER is unacceptable. For example, when the value of the error counter 144 exceeds some threshold, the BER mode display circuitry 146 may cause all the pixels it controls to turn red.

Figure 7:
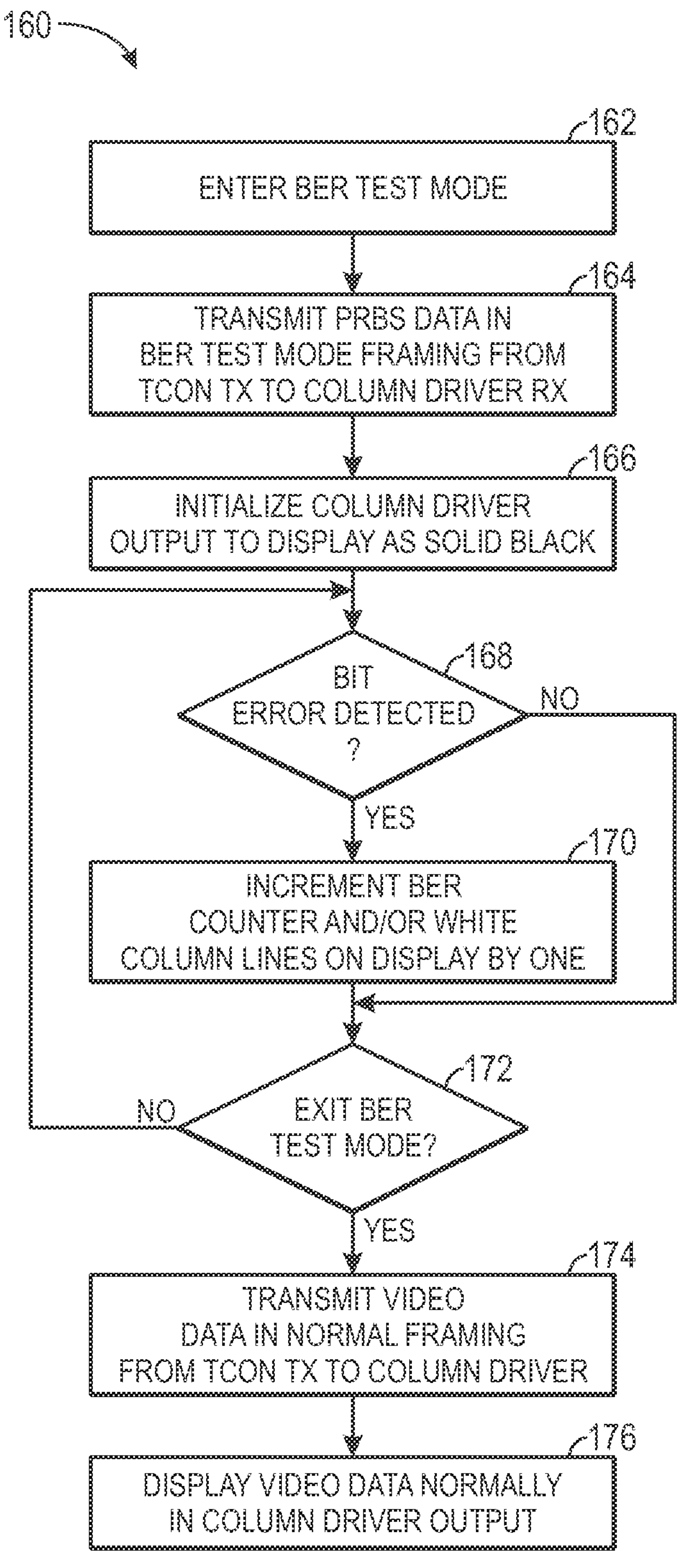
FIG. 7 is a flowchart describing a method for testing bit error rate (BER) in the display drivers of the electronic display of FIG. 4, in accordance with an embodiment.

In general, the display 18 of the example of FIG. 5 may determine and indicate the bit error rate (BER) of the data links 102 as shown in a flowchart 160 of FIG. 7. The flowchart 160 may begin when the display 18 enters a BER test mode (block 162). Entering the BER test mode may involve receiving a BER test mode control signal from the processor(s) 12 (if the display 18 is installed in an electronic device 10) or an external electronic device (if the display 18 is still being manufactured) via the interface 72 of the display 18 (e.g., via the eDP connector 80). It should be appreciated that processor-executable instructions running on the processor(s) 12 may determine to send such a control signal to the electronic display interface 72 of the display 18. In response to the BER test mode control signal, the BER test mode enable circuitry 108 of the timing controller (TCON) 82 may send the BER mode enable signal 110 to the transmitters (TXs) 100 of the TCON 82.

As noted above, the BER mode enable signal 110 may cause the TXs 100 of the TCON 82 to begin transmitting test data in a test mode format to respective column drivers (CDs) 84. This test data may be, for example, pseudorandom binary sequence (PRBS) data generated by the PRBS generator 122 of the TX 100. Alternatively, the test data may be any predictable or known sequence of data (e.g., 101010 repeated indefinitely). The column drivers (CDs) 84 may initialize their output to program all pixels to solid black (block 166). For example, the error counters 144 of the column drivers (CDs) 84 may be reset when the protocol decoder 132 causes the selection signal 133 to send the test data to the BER detection circuitry 88. As a result, the BER mode display circuitry 146 may output only pixel programming signals that cause black pixels to appear on the active display area 78.

As the PRBS checker 142 processes the test data for bit errors, if a bit error is detected (decision block 168), the error counter 144 may be incremented and cause, for example, white column lines to be displayed for each bit error that is counted (block 170). At this point, an operator or electronic device can visually observe the extent of bit errors at various column drivers (CDs) 84 of the electronic display. This process may continue until the display 18 exits the BER test mode (decision block 172). That is, the processor(s) 12 may cause the BER test mode enable circuitry 108 to stop supplying the BER mode enable signal 110 to the TXs 100 of the TCON 82. The TXs 100 may respond by beginning to send normal data and the protocol framing circuitry 126 of the TXs 100 may frame the data to indicate as such. The column driver (CD) 84 may detect this change in framing of the data and thus may cause the BER detection circuitry 88 no longer to process the received data (block 174). Thereafter, the received data (i.e., normal data 120) may be processed by the normal display circuitry 140 and displayed on the active display area 78 (block 176).

Figure 8:
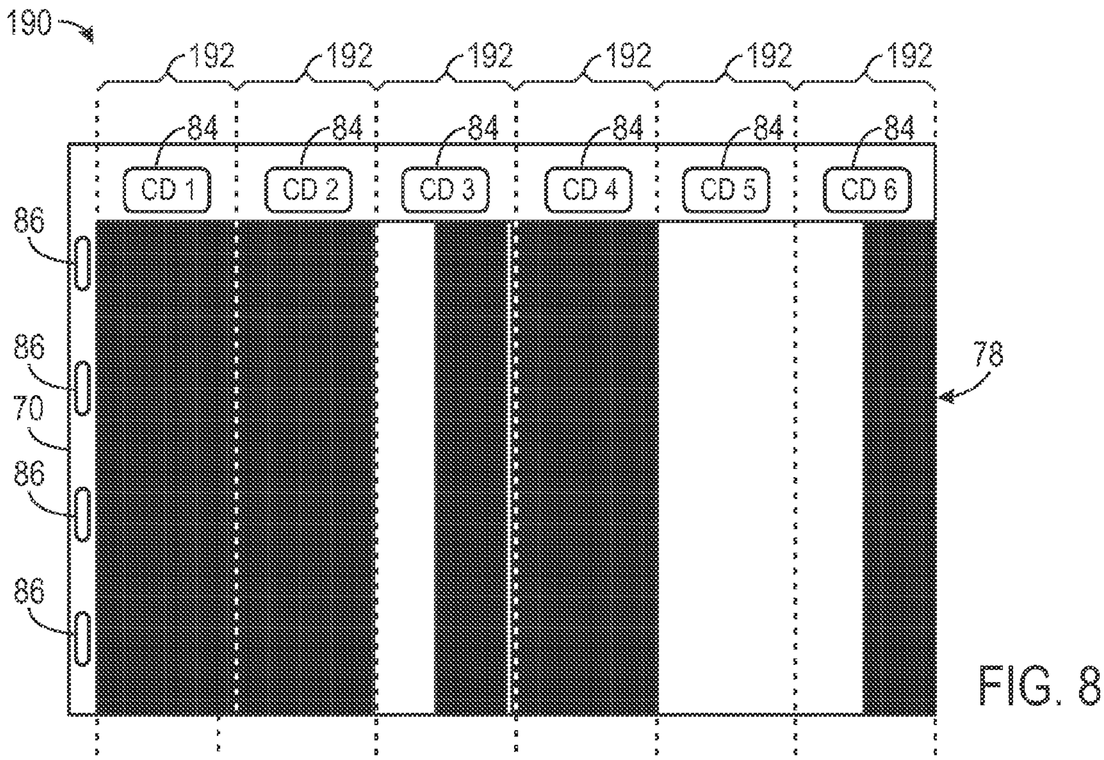
FIGS. 8 and 9 are illustrations of manners in which indications of bit error rates (BERs) can be displayed on the electronic display of FIG. 5, in accordance with embodiments.
Figure 9:
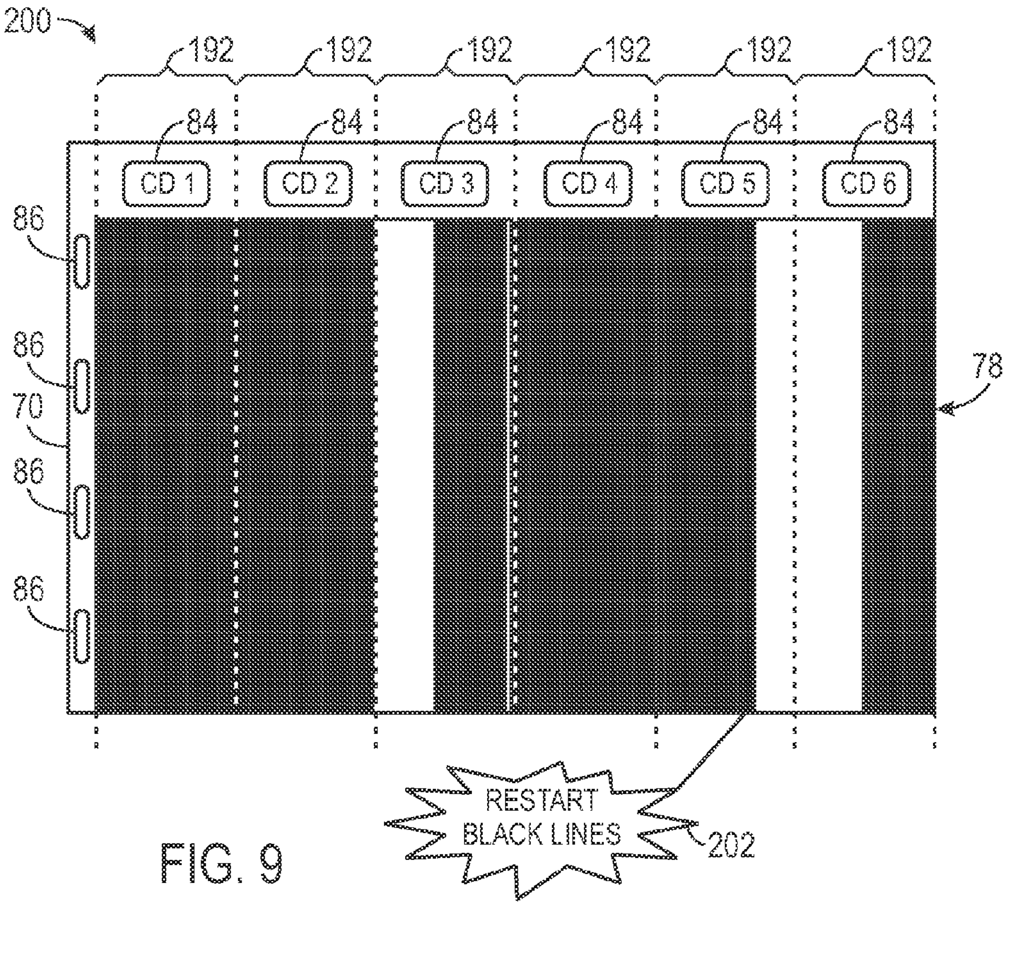

As mentioned above, the column drivers (CDs) 84 may provide indications of the bit error rates (BERs) of the data links 102 by programming their respective segments of the active display area 78. For example, as shown by a BER visualization 190, different segments of the active display area 78 may display different numbers of white columns according to the BER associated with different column drivers (CDs) 84. In the example of FIG. 8, the display panel 70 includes several row drivers (RDs) 86 and six column drivers (CDs) 84. It should be appreciated that the number of column drivers (CDs) 84 in FIG. 8 is provided for ease of explanation and more or fewer column drivers (CDs) 84 may appear in an actual implementation of a display panel 70.

In FIG. 8, each column driver (CD) 84 programs pixels of a different columnar segment 192 of the active display area 78. Thus, when a bit error is detected by one of the column drivers (CDs) 84, a column of pixels associated within that columnar segment 192 may be switched from black to white by that column driver (CD) 84. Thus, it should be appreciated that, in the BER visualization 190, the column drivers (CDs) 84 labeled "CD1," "CD2," and "CD4," have not detected any bit errors and therefore all of the pixels that they control remain solid black in color. The column drivers (CDs) 84 labeled "CD3" and "CD6" have detected some bit errors, such that approximately half of the columnar segments 192 that they control have been switched from black to white. Meanwhile, the column driver (CD) 84 labeled "CD5" has detected so many bit errors that the entire columnar segment 192 that it controls has been switched to white. It should be understood that the BER visualization 190 may indicate the BER despite only displaying the total number of bit errors detected. That is, whether the data links 102 associated with the column drivers (CDs) 84 have bit error rates (BERs) that are unacceptable may depend at least in part on the amount of time that has past since the column drivers (CDs) 84 first entered the BER test mode and began detecting bit errors.

To account for a greater number of bit errors than might be capable of being displayed in the manner used in the BER visualization 190, additional variations in colors of columns may be employed. For example, as shown by a BER visualization 200 of FIG. 9, when a column driver (CD) 84 has detected so many bit errors that all of the pixels in the columnar segment 192 that it controls have been set to white, that column driver (CD) 84 may subsequently begin to switch columns of pixels back to black. For example, the column driver (CD) 84 labeled "CD5" in the BER visualization 200 of FIG. 9 has restarted black lines (numeral 202) after having detected more bit errors in the test data than could be shown only by switching the black lines to white once.

Figure 10:
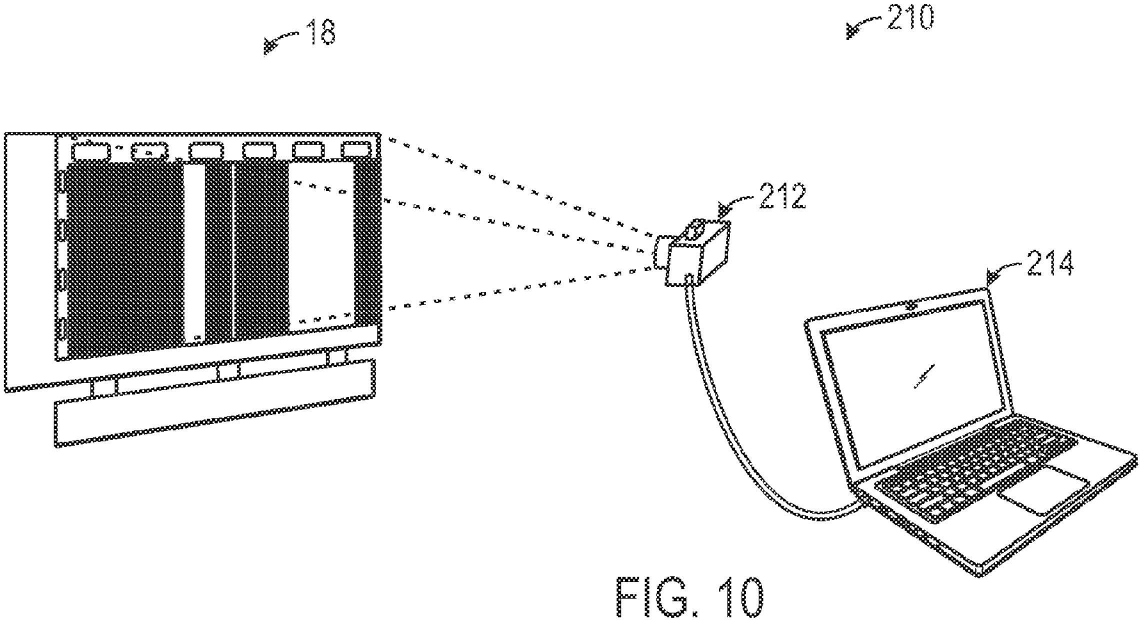
FIG. 10 is a schematic perspective view of an electronic display bit error rate (BER) detection system, in accordance with an embodiment.
Figure 11:
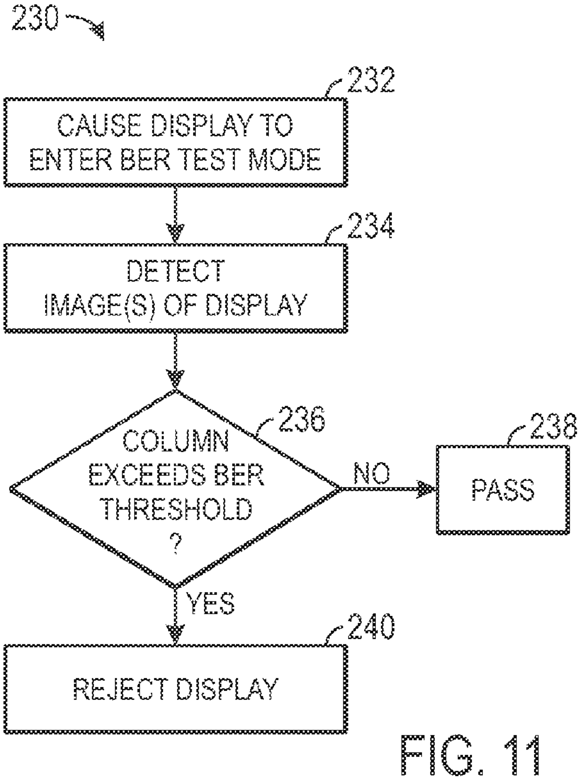
FIG. 11 is a flowchart describing a method for maintaining quality control during the manufacture of an electronic display using the system of FIG. 10, in accordance with an embodiment.

These or other manners of visualizing bit errors of the display 18 may be used to enhance quality control during the manufacture of the display 18 or an electronic device 10 employing the display 18. For example, an operator may observe the extent to which white columns of pixels are displayed on the display 18 when the display 18 is in a BER test mode. Additionally or alternatively, as shown in FIG. 10, a quality control system 210 may automatically detect when the bit error rate (BER) of a particular data link 102 exceeds some minimum threshold for quality. In the example of FIG. 10, the quality control system 210 may include a digital imaging device 212 that is coupled to a data processing system (e.g., a computer system 214). The digital image device 212 may capture images of the display 18 while it is in the BER test mode. Based on the rate and extent to which the columns of white pixels appear on the display 18, the quality control system 210 may determine when a data link 102 of an display 18 is likely to have a latent failure, allowing manufacturers so take remedial action.

For example, during the manufacture of the display 18 or an electronic device 10 that employs the display 18, operators and/or the quality control system 210 may reject or take remedial action if the display 18 indicates that the BER of a data link 102 is excessive. For example, as shown by a flowchart 230 of FIG. 11, an operator, the quality control system 210, and/or an electronic device 10 in which the display 18 is installed may send a BER test mode control signal to the display 18 to cause the display 18 to enter the BER test mode (block 232). An operator and/or the digital imaging circuitry 212 of the quality control system 210 may detect one or more images of the display 18 while the display 18 is in the BER test mode (block 234).

If, after a certain period of time, it is apparent that none of the data links 102 associated with the column drivers (CDs) 84 exceed a BER threshold, the display 18 may be determined not likely to have a latent failure. As such, the display 18 may pass (block 238). On the other hand, if after the period of time, it is apparent that a data link 102 associated with a particular column driver (CD) 84 exceeds some BER threshold (e.g., the number of white columns appears to exceed some threshold number), the display 18 may be identified as not meeting the minimum quality standard of the display 18 (block 240). The rejected display 18 may be repaired or discarded to avoid latent failures from occurring after sale to an end user. For example, the data link 102 that has exceeded the BER threshold may be tuned by varying programming parameters available on the TCON 82 and/or the column driver (CD) 84 associated with the data link 102. In some cases, the programming parameters available on the TCON 82 and/or the column driver (CD) 84 associated with the data link 102 may be varied while the display 18 is in the BER test mode. As such, the BER of the data link 102 may be visualized while the data link 102 is being tuned to achieve a lower BER than might be possible based on a human perception of BER alone.

In some embodiments, the display 18 may provide a digital indication of the bit error rate (BER) back to the timing controller (TCON) 82. Since the column drivers (CDs) 84 could not employ the unidirectional data links 102 to send signals back to the TCON 82, the column drivers (CDs) 84 may instead use the emergency lost-clock data link 104. In an example appearing in FIG. 12, the TCON 82 of the display 18 includes, in addition to lost-clock detection circuitry, column driver (CD) BER count receiver circuitry 250. The column driver (CD) BER count receiver circuitry 250 may be able to receive an indication of the BER of a data link 102 from one column driver (CD) 84 at a time via a single wire interface (SWI) signal over the emergency lost-clock data link 104.

As mentioned above, the emergency lost-clock data link 104 may be shared by all of the column drivers (CDs) 84. Under normal operating conditions, if one of the column drivers (CDs) 84 loses synchronization with the embedded-clock data signal from its respective TX 100, that column driver (CD) 84 may transmit a lost-clock signal across the emergency lost-clock data link 104. When the lost-clock detection circuitry of the TCON 82 receives this lost-clock signal, the TCON 82 may resend a clock signal to that column driver (CD) 84. Thereafter, the column driver (CD) 84 may be synchronized once more to the embedded-clock signal of the data being sent by its respective TX 100 in the TCON 82.

Figure 12:
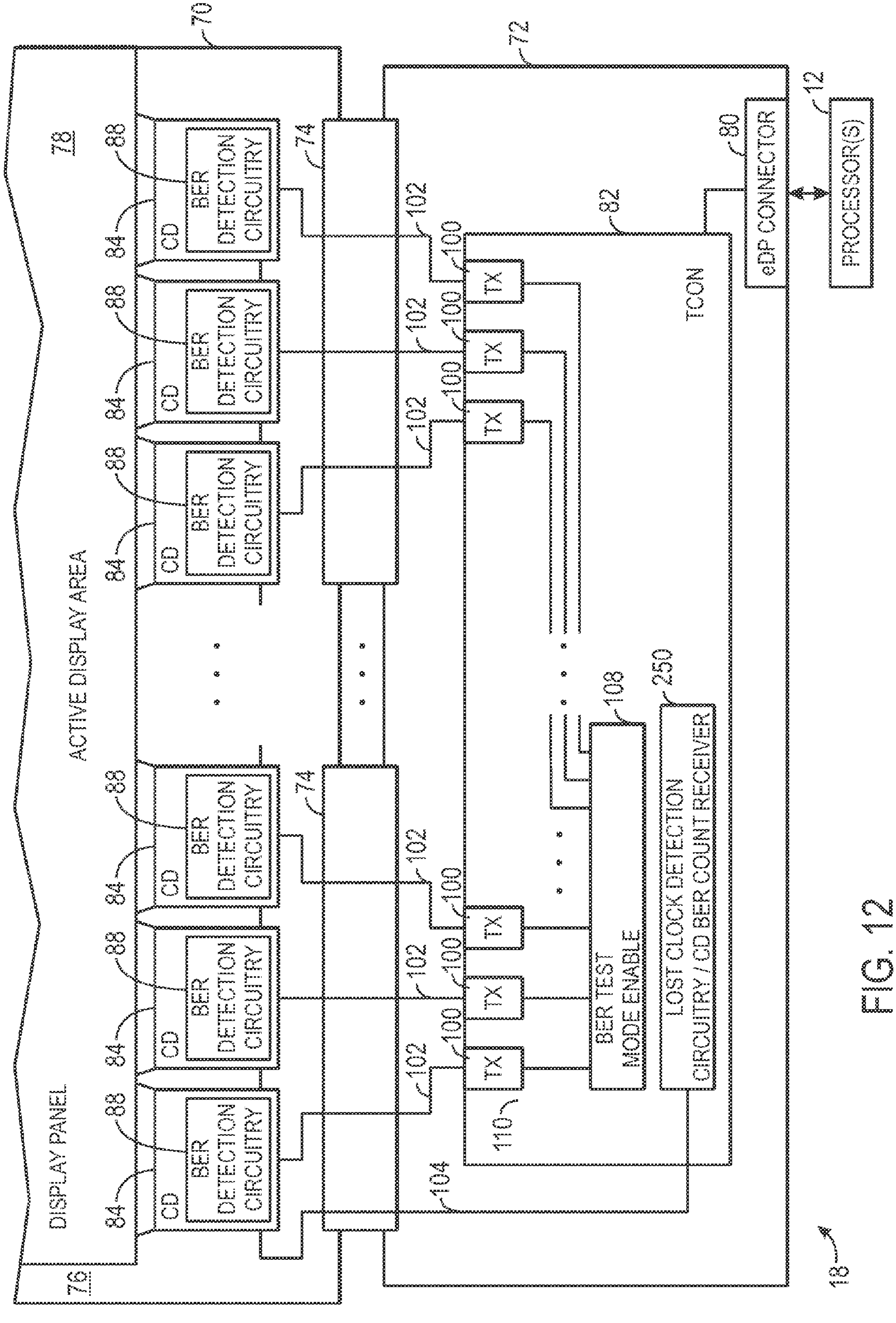
FIG. 12 is a block diagram of an alternative embodiment of the electronic display of FIG. 4, in which bit error rate (BER) detection circuitry in the display drivers can provide an indication of the BER via a shared unidirectional link back to the timing controller (TCON), in accordance with an embodiment.

Because of the unidirectional natural of the data links 102 between the TXs 100 and the column drivers (CDs) 84, the column drivers (CDs) 84 cannot provide an indication of the bit error rate (BER) of the data link 102 back to the timing controller (TCON) 82 using the same data link 102. As mentioned above, one manner in which the BER detection circuitry 88 may overcome this limitation may involve displaying the bit errors on the active display area 78 of the display panel 70. In the embodiment of FIG. 12, the BER detection circuitry 88 may detect bit errors of the data link 102 and provide a bit error count via a single wire interface (SWI) signal using the emergency lost-clock data link 104.

Since only one column driver (CD) 84 can transmit a signal over the emergency lost-clock data link 104 at any time, the TCON 82 may cause a particular column driver (CD) 84 to transmit the indication of the BER over the emergency lost-clock data link 104. For example, as shown in FIG. 12, the BER test mode enable circuitry 108 may individually control each TX 100 so that, in general, only one TX 100 and respective column driver (CD) 84 is providing an indication of the BER over the emergency lost-clock data link 104 at any time.

Figure 13:
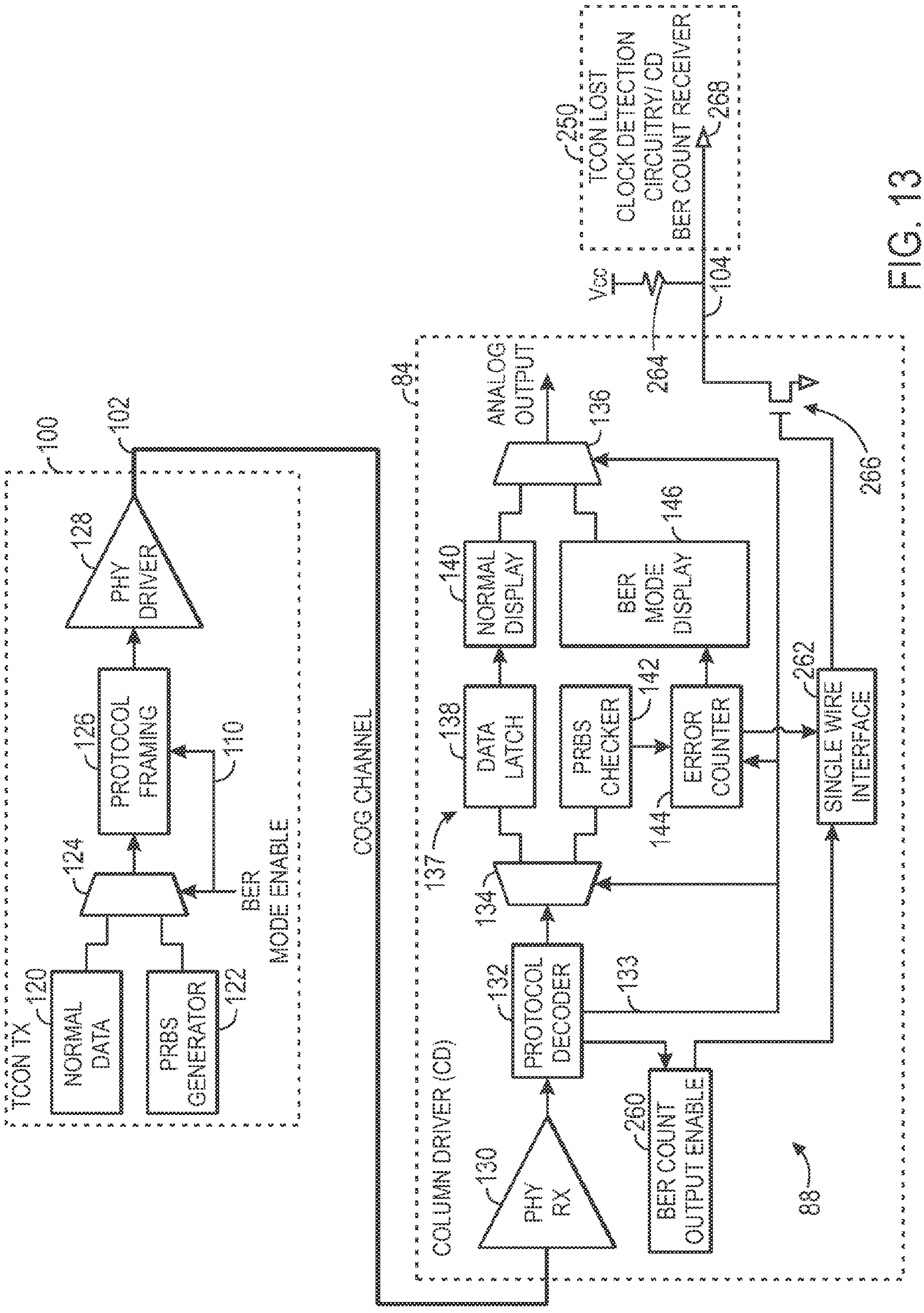
FIG. 13 is a block diagram of communication circuitry of the timing controller (TCON) and one display driver of the electronic display of FIG. 12 that enables a bit error rate (BER) test mode with output to the TCON, in accordance with an embodiment.
Figure 14:
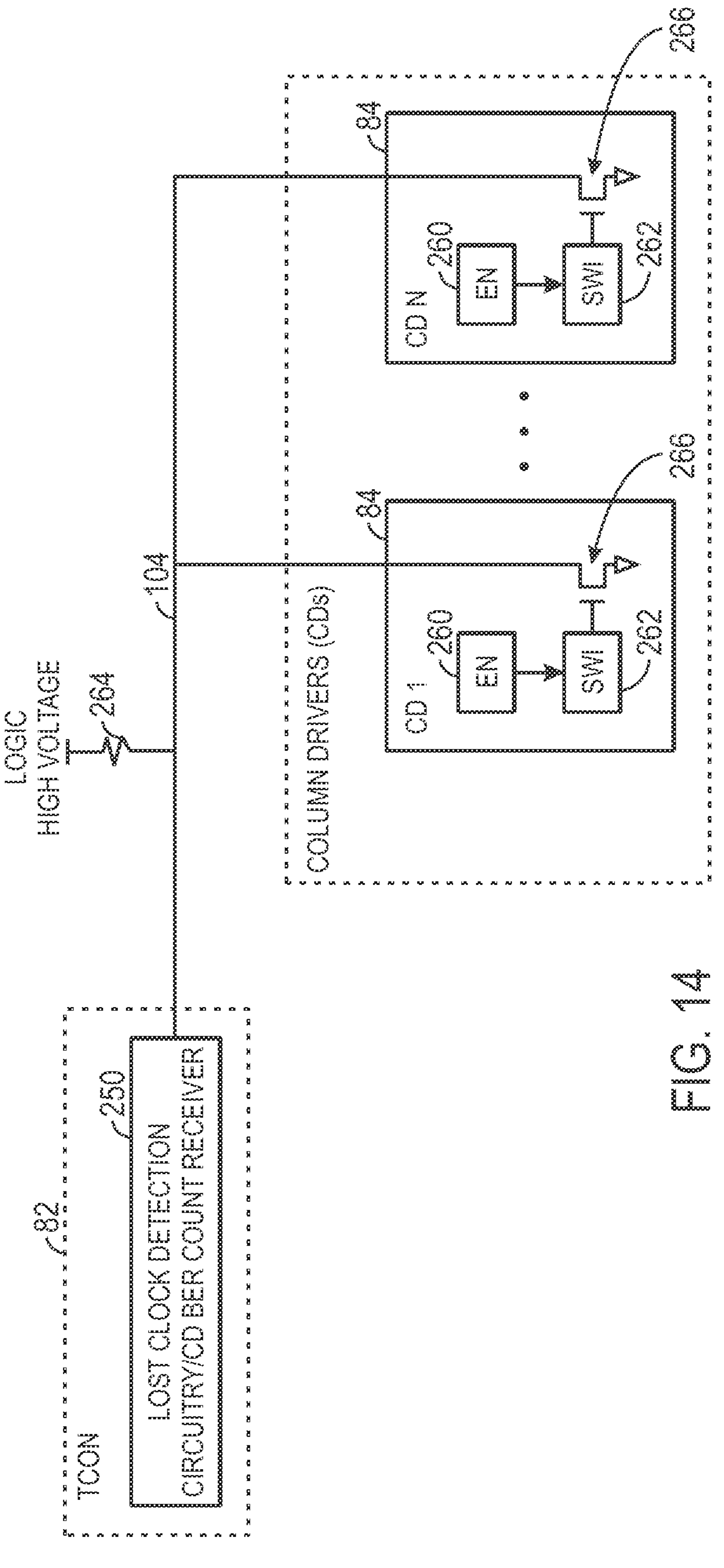
FIG. 14 is a block diagram illustrating a single wire interface shared by all column drivers of the electronic display of FIG. 12, in accordance with an embodiment.
Figure 15:
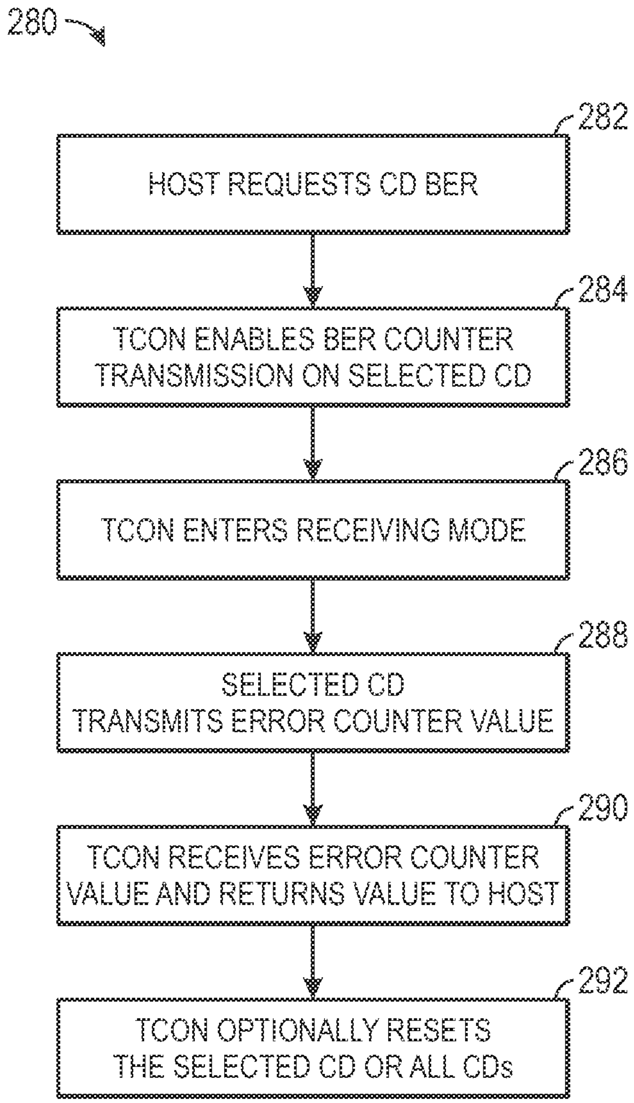
FIG. 15 is a flowchart describing a method for determining a bit error rate (BER) of a selected column driver of the electronic display of FIG. 12, in accordance with an embodiment.

In an example shown in FIG. 13, the transmitter (TX) 100 may include the same general components as described above with reference to FIG. 6. Thus, when the TX 100 receives the BER mode enable signal 110, the TX 100 may transmit test data (e.g., pseudorandom binary sequence (PRBS) data from the PRBS generator 122). Moreover, the protocol framing circuitry 126 may frame the test data in a manner that identifies the test data as such when it is transmitted by the physical (PHY) driver 128. The protocol framing circuitry 126 also may encode a BER count output request signal that may or may not be included at the same time the test data is being transmitted. As noted below, such a BER count output request signal may cause the column driver (CD) 84 to reply with a count of the bit errors detected in the test data.

The column driver 84 respectively associated with the TX 100 may receive this data from the data link 102 via the physical receiver (PHY RX) 130. The protocol decoder 132 may ascertain whether, for example, the bit error rate (BER) detection circuitry 88 should be employed and, if so, may output the appropriate selection signal 133. The protocol decoder 132 may also determine when the BER count output request signal has been sent and, if so, may cause BER count output enable circuitry 260 to generate a BER count output enable signal, which may cause the column driver (CD) 84 to send a count of detected bit errors to the TCON 82.

In the example of FIG. 13, the BER detection circuitry 88 includes the PRBS checker 142, the error counter 144, and the BER mode display circuitry 146, which may operate in a similar manner to the example described above with reference to FIG. 6 and thus are not discussed further. Alternative embodiments may not include the BER mode display circuitry 146. The BER detection circuitry 88 of the example of FIG. 13 also may include BER count output enable circuitry 260, which may cause single wire interface (SWI) circuitry 262 to provide an indication of the value held by the error counter 144 over the emergency lost-clock data link 104.

In particular, in some embodiments, when the protocol decoder 132 detects the BER count output request signal in the data received from the TX 100, the BER count enable circuitry 260 may cause the single wire interface (SWI) circuitry 262 to output the value of the error counter 144 to the column driver (CD) BER count receiver circuitry 250 of the TCON 82. The data link 104 may include, for example, a pull-up resistor 264 coupled to some voltage (e.g., a supply voltage such as the Vcc) and a transistor 266. By modulating a voltage on the gate of the transistor 266, the single wire interface (SWI) circuitry 262 can transmit an indication of the error counter 144 value over the emergency lost-clock data link 104. This signal may be received by a receiver (RX) 268 of the column driver (CD) BER count receiver circuitry 250 in the TCON 82.

Although not shown in FIG. 13, it should be understood that all of the column drivers 84 may share the same emergency lost-clock data link 104, over which any one of the column drivers (CDs) 84 can transmit the indication of its respective error counter 144. For example, as shown in FIG.

14, the emergency lost-clock data link 104 is shown to be shared by N column drivers (CDs) 84, labeled "CD1" to "CD N." Each of the column drivers (CDs) 84 may include respective BER count output enable circuitry 260 and single wire interface (SWI) circuitry 262 and a signaling transistor 266. A single pull-up resistor 264 may cause the emergency lost-clock data link 104 to default to a logic high voltage (e.g., Vcc). It should be appreciated that the column drivers (CDs) 84 may still request resynchronization via the emergency lost-clock data link 104 according to conventional techniques.

Since the individual column drivers (CDs) 84 can communicate precise bit error rate (BER) values over the emergency lost-clock data link 104, processor-executable instructions (e.g., software or firmware) running on the processor(s) 12 may occasionally perform diagnostic evaluations of the display 18. For example, as shown by a flowchart 280 of FIG. 15, processor-executable instructions (e.g., software and/or firmware) may issue a request to the interface 72 of the display 18 for a bit error rate (BER) of a particular column driver (CD) 84 (block 282). Upon receipt of a signal requesting the BER of the particular column driver (CD) 84, the timing controller (TCON) 82 may cause one or more of the column drivers (CDs) 84 to enter a BER test mode by sending the BER mode enable signal 110 to a particular TX 100 of the TCON 82. Through an indication by the TX 100 to the selected column driver (CD) 84, the TCON 82 may also request that the column driver (CD) 84 provide an indication of the BER over the emergency lost-clock data link 104 (block 284). In some embodiments, the TCON 82 may enter a receiving mode (block 286), such that when a signal is received over the emergency lost-clock data link 104, the lost-clock detection circuitry-column driver (CD) BER count receiver circuitry 250 interprets the signal as a BER value and not a request for resynchronization.

The selected column driver (CD) 84 currently in the bit error rate (BER) test mode may provide an indication of the BER by transmitting the value of its error counter 144 over the emergency lost-clock data link 104 (block 288). The lost-clock detection circuitry/column driver (CD) BER count receiver circuitry 250 may interpret the signal received over the emergency lost-clock data link 104 as the error counter value and may return this value to the processor(s) 12 (block 290). The process of blocks 284-290 may repeat, periodically or otherwise, or may occur only once before the column driver (CD) 84 is reset (block 292). Additionally or alternatively, when other column drivers (CDs) 84 are operating in a BER test mode, the error counters 144 associated with these column drivers (CDs) 84 also may be reset. However, it should be appreciated that, in some embodiments, the column drivers (CDs) 84 may continue to detect the BER of their respective data links 102 if desired.

It may be appreciated that a data link 102 may be tuned using the indication of the BER received over the emergency lost-clock data link 104. For example, programming parameters available on the TCON 82 and/or the column driver (CD) 84 associated with a data link 102 may be varied while the display 18 is in the BER test mode. As such, the BER of the data link 102 received over the emergency lost-clock data link 104 may be used by the processor(s) 12 and/or a human operator to tune the data link 102 to achieve an acceptable BER. The resulting BER of the data link 102 may be lower than might otherwise be possible based on a human perception of BER alone.

Figure 16:
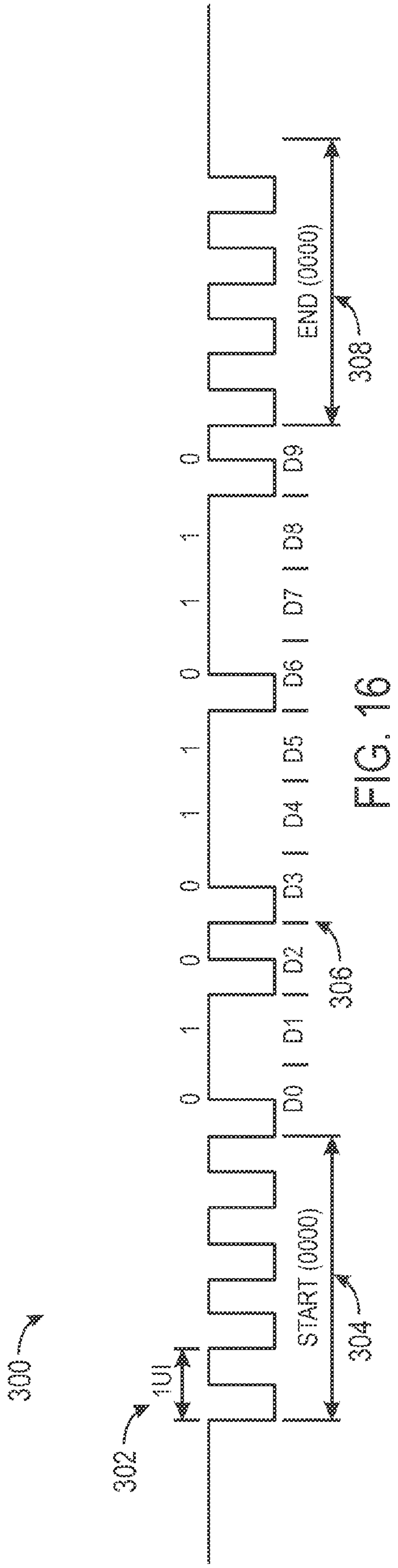
FIG. 16 is a timing diagram representing data transmitted across the single wire interface that represents a bit error rate (BER) of a column driver of the electronic display of FIG. 12, in accordance with an embodiment.
Figure 17:
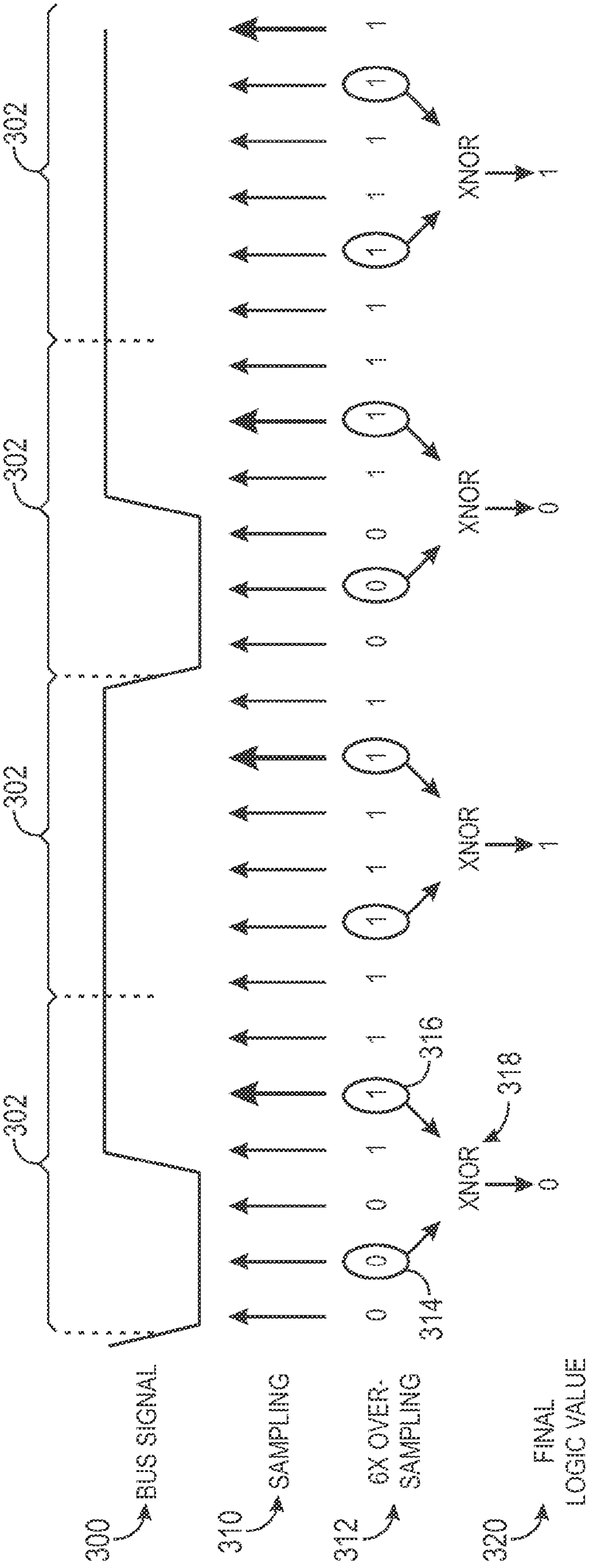
FIG. 17 is a timing diagram illustrating a manner of detecting a bit error rate (BER) signal from a single wire interface, in accordance with an embodiment.
Figure 18:
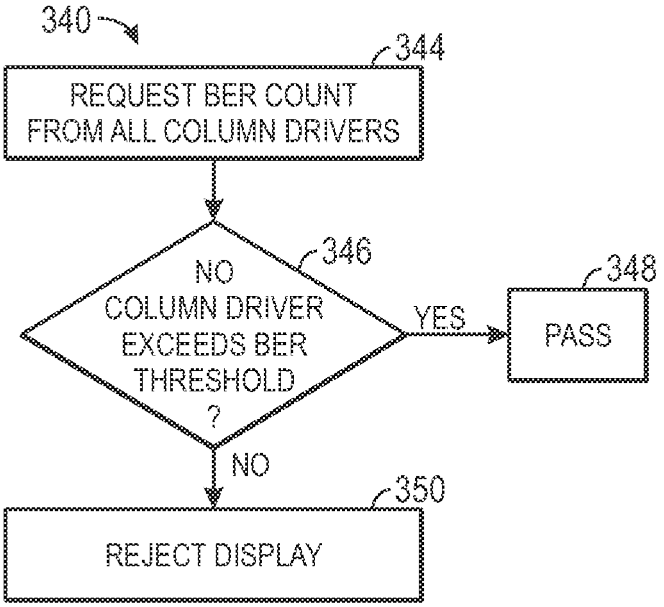
FIG. 18 is a flowchart describing a method for quality control during the manufacture of the electronic display of FIG. 12, in accordance with an embodiment.

The lost-clock detection circuitry/column driver (CD) BER count receiver circuitry 250 may determine the error value transmitted over the emergency lost-clock data link 104 using any suitable technique. For example, as shown in FIGS. 16 and 17, the lost-clock detection circuitry/column driver (CD) BER count receiver circuitry 250 may use a majority voting, oversampling technique. In particular, one example of a bus signal 300 transmitted over the emergency lost-clock data link 104 appears in FIG. 16. The bus signal 300 may include various data values represented as binary 0s and 1s, each of which may be respectively provided over one unit interval (UI) 302. The error value signal 300 may begin with a start sequence 304 followed by a data sequence 306. An end sequence 308 may signal the end of the bus signal 300. The start sequence 304 and end sequence 308 may be any suitable, desired sequence that can be detected by the lost-clock detection circuitry/column driver (CD) BER count receiver circuitry 250 as the beginning and/or end, respectively, of such an error value signal 300. The data segment 306 of the error value signal 300 may represent the contents of the error counter 144 in the BER detection circuitry 88 of the column driver (CD) 84. In the example of FIG. 16, the data segment 306 includes 10 bits of data. It should be understood, however, that any other suitable number of bits may be employed.

The lost-clock detection circuitry/column driver (CD) BER count receiver circuitry 250 may detect the values of the bus signal 300 through majority voting. For example, as shown in FIG. 17, the lost-clock detection circuitry/column driver (CD) BER count receiver circuitry 250 may engage in sampling 310 at multiple points within each unit interval (UI) 302. In the example of FIG. 17, such sampling 310 results in 6× oversampling (numeral 312). By oversampling the bus signal 300, the actual transmitted value is more likely to be detected in case of some erroneous shift in time.

The oversampled values 312 may be used to determine the value of data transmitted in each UI 302. For example, a second oversampled value 314 and a fifth oversampled value 316, in a logical XNOR operation 318, may result in a final logic value 320. In the example of FIG. 17, the second value 314 and fifth value 316, 0 and 1, respectively, produce a final logic value 320 of 0 in the XNOR operation 318.

Receiving indications of bit error rate (BER) from individual column drivers (CDs) 84 may permit quality control at the time of the manufacture of the display 18 and/or may allow as diagnostic statistics to be collected after the display 18 has been incorporated into the electronic device 10 and/or sold to an end user. In one example, maintaining quality control while manufacturing a display 18 or an electronic device 10 that includes an electronic display may take place according to a flowchart 340 of FIG. 18. The flowchart 340 may begin when a BER count is requested one-at-a-time from the column drivers (CDs) 84 (block 344). Such a request may be carried out, for example, by a manufacturer of the display 18, and/or a host such as the processor(s) 12 (e.g., via processor-executable instructions running on the processor(s) 12).

If none of the column drivers (CDs) 84 returns an indication of bit error rate (BER) that is higher than some minimum threshold for quality, the display 18 may be deemed to have passed (block 348). Otherwise, if any column driver (CD) 84 returns an indication of the BER that exceeds the minimum threshold of quality (decision block 346), the display 18 may be rejected (block 350) and thus repaired or discarded.

Additionally or alternatively, processor-executable instructions (e.g., software and/or firmware) occasionally run on the processor(s) 12 of the electronic device 10 to gather diagnostic or statistical information regarding the continuing health of the data links 102 over time. For example, such processor-executable instructions may monitor the BER from the column drivers (CDs) 84 to prepare for a possible failure of a data link 102 (e.g., by alerting the manufacturer of the electronic device 10 so that failure could be preempted). Additionally or alternatively, this diagnostic information can be returned to the manufacturer of the electronic device 10 to allow the manufacturer to track the degradation of the data links 102 as they may occur over time.

Technical effects of the present disclosure include, among other things, a manner of identifying latent failures of data links of an electronic display (e.g., chip-on-glass (COG) data links). That is, by detecting an indication of the bit error rate (BER) of data links to data drivers of such an electronic display, a bit error rate (BER) that is low enough to suggest a future failure is likely to occur, but which does not cause, at present, screen noise to be visible on the display 18, to be detected. In addition, diagnostic information or statistics regarding the health of the data links 102 over time may be collected.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic display comprising:

a timing controller configured to transmit test data over at least one data link, wherein the test data comprises a known or predictable stream of data, wherein the timing controller comprises pseudorandom binary sequence generating circuitry to generate the pseudorandom binary sequence; and display driver circuitry configured to receive the test data via the at least one data link and detect bit errors associated with the at least one data link based at least in part on the test data, wherein the display driver circuitry comprises pseudorandom binary sequence check circuitry configured to detect the bit errors associated with the at least one data link based at least in part on the test data.

2. The electronic display of claim 1, wherein the test data comprises a pseudorandom binary sequence.

3. The electronic display of claim 1, wherein the test data comprises 8b10b-encoded data.

4. The electronic display of claim 1, wherein the at least one data link comprises a chip-on-glass interconnection.

5. The electronic display of claim 1, comprising an array of pixels configured to be programmed by the display driver circuitry, wherein the display driver circuitry is configured to provide an indication of the bit errors by programming the array of pixels to cause the indication of the bit errors to be displayed on the array of pixels.

6. The electronic display of claim 1, comprising a single wire interface configured to provide an indication of the bit errors from the display driver circuitry to the timing controller via a different data link from the at least one data link.

7. An electronic device comprising:

an electronic display configured to, upon receipt of a control signal, operate in a bit error rate test mode and detect a bit error rate associated with one of a plurality of intra-display chip-on-glass data links when operating in the bit error rate test mode, wherein the electronic display is configured to display an indication of the bit error rate on the electronic display when the electronic display is operating in the bit error rate test mode; and data processing circuitry configured to issue the control signal to the electronic display to cause the electronic display to operate in the bit error rate test mode.

8. The electronic device of claim 7, wherein the data processing circuitry is configured to provide image data to the electronic display and the electronic display is configured to display the image data when the electronic display is not operating in the bit error rate test mode.

9. The electronic device of claim 7, wherein the electronic display is configured to provide an indication of the bit error rate to the data processing circuitry when the electronic display is operating in the bit error rate test mode.

10. An electronic display comprising:

a timing controller comprising:

bit error rate test mode determination circuitry configured to generate a bit error rate test mode enable signal based at least in part on a corresponding control signal from a host processor; and a plurality of transmitters each associated with a respective one of a plurality of intra-display unidirectional data links, each of the plurality of transmitters comprising:

physical transmission circuitry configured to transmit data over the associated intra-display unidirectional data link; and bit error rate test mode selection circuitry configured to cause the physical transmission circuitry to transmit either image data or test data depending on the bit error rate test mode enable signal; and a plurality of data drivers each respectively associated with one of the plurality of intra-display unidirectional data links and one of the plurality of transmitters, and configured to program a respective one of a plurality of active display segments of the electronic display, each of the plurality of data drivers comprising:

a physical receiver configured to receive the data from the one of the plurality of transmitters over the associated intra-display unidirectional data links;

bit error detection circuitry configured to detect bit errors of the associated data link based at least in part on the data when the data comprises test data;

counter circuitry configured to hold a count of the detected bit errors; and bit error display circuitry configured to receive the count of the detected bit errors and output a display control signal configured to cause an indication of the count of the detected bit errors of the associated data link to be programmed on the associated one of the plurality of active display segments of the electronic display.

11. The electronic display of claim 10, wherein each of the plurality of transmitters comprises protocol framing circuitry configured to frame the data to identify whether the data comprises the test data and wherein each of the plurality of data drivers comprises protocol decoding circuitry configured to identify when the data received from a respective one of the plurality of transmitters comprises the test data based at least in part on the manner in which the data is framed.

12. The electronic display of claim 10, wherein each of the plurality of transmitters comprises test data generation circuitry configured to generate the test data.

13. The electronic display of claim 12, wherein the test data generation circuitry comprises a pseudorandom binary sequence generator.

14. The electronic display of claim 10, wherein the bit error display circuitry of at least one of the plurality of data drivers is configured to output the display control signal, wherein the display control signal is configured to cause the indication of the count of the detected bit errors to be programmed on the associated one of the plurality of active display segments of the electronic display as groups of pixels of a particular color, wherein each of the groups of pixels of the particular color represent at least detected one bit error.

15. The electronic display of claim 10, wherein the bit error display circuitry of at least one of the plurality of data drivers is configured to output the display control signal, wherein the display control signal is configured to cause the indication of the count of the detected bit errors to be programmed on the associated one of the plurality of active display segments of the electronic display as numerals.

16. The electronic display of claim 10, wherein the bit error display circuitry of at least one of the plurality of data drivers is configured to output the display control signal, wherein the display control signal is configured to cause the indication of the count of the detected bit errors to be programmed on the associated one of the plurality of active display segments of the electronic display as a color that changes as the count of the bit errors changes.

17. An electronic display comprising:

a timing controller configured to transmit two data signals, one of the two data signals comprising test data of a known or predictable value;

two outgoing unidirectional data links coupled to the timing controller and respectively configured to carry the two data signals away from the timing controller;

two display drivers respectively coupled to the two outgoing unidirectional data links, each display driver being configured to:

receive one of the two data signals;

determine a bit error rate associated with the one of the two data signals when that data signal comprises the test data; and transmit an indication of the bit error rate to the timing controller; and an incoming unidirectional data link operably coupled to both of the two display drivers, the incoming unidirectional data link configured to carry the indication of the bit error rate from the one of the two display drivers that received the test data to the timing controller.

18. The electronic display of claim 17, wherein the incoming unidirectional data link is configured to carry a lost clock signal from one of the two display drivers to the timing controller when that display driver loses synchronicity with the timing controller.

19. The electronic display of claim 17, wherein each display driver comprises bit error rate count enable circuitry configured to cause that display driver to transmit the indication of the bit error rate upon receipt of a command to do so by the timing controller.

20. The electronic display of claim 17, wherein each display driver comprises bit error rate count enable circuitry configured to cause that display driver to transmit the indication of the bit error rate some period of time after that display driver begins to receive data that comprises the test data.

21. A method for quality control for an electronic display comprising:

causing the electronic display to enter a bit error rate test mode, wherein, when the electronic display is in the bit error rate test mode, the electronic display causes an indication of a bit error rate associated with an internal data link to be displayed on the electronic display or output digitally through an electronic display interface of the electronic display, or both;

determining whether the bit error rate exceeds a threshold by:

detecting a digital image of the indication of the bit error rate displayed on the electronic display using a digital imaging device, providing the digital image to an electronic device, and identifying the bit error rate using the electronic device by analyzing the digital image; or receiving the indication of the bit error rate in an electronic device via the electronic display interface of the electronic display and identifying the bit error rate based at least in part on the indication of the bit error rate using the electronic device; and determining to discard or repair the electronic display when the bit error rate exceeds the threshold, wherein determining to discard or repair the electronic display comprises determining in the electronic device whether the bit error rate identified using the electronic device exceeds the threshold.

22. An article of manufacture comprising:

at least one tangible, non-transitory machine-readable medium including instructions for execution by a processor, the instructions comprising:

instructions to issue a request to an electronic display, wherein the request comprises a request to provide an indication of a bit error rate that is determined by the display associated with a data link between a timing controller and a display driver of the electronic display; and instructions to receive the indication of the bit error rate associated with the data link from the electronic display.

23. The article of manufacture of claim 22, wherein the instructions comprise instructions to determine whether the bit error rate associated with the data link exceeds a threshold based at least in part on the indication of the bit error rate.

24. The article of manufacture of claim 22, wherein the instructions comprise instructions to cause one or more programming parameters of the timing controller or the display driver, or both, to vary to tune the data link based at least in part on the indication of the bit error rate associated with the data link received from the electronic display.

25. A method comprising:

sending a test data signal from a timing controller of an electronic display to a display driver of the electronic display over an internal data link of the electronic display, wherein the test data signal comprises a stream of known or predictable data;

receiving the test data signal in the display driver of the electronic display;

detecting bit errors in the test data signal using the display driver of the electronic display; and displaying an indication of the bit errors on a display panel of the electronic display using the display driver of the electronic display.

26. The method of claim 25, comprising counting the bit errors using the display driver, wherein displaying the indication of the bit errors comprises displaying a count of the bit errors.

* * * * *